/ Patented Aug. 5, 1947

2,425,276

UNITED STATES PATENT OFFICE 2,425,276

ALIPHATIC NITRO DERIVATIVES OF KETO-ESTERS AND METHOD FOR PREPARING THEM

Carl T. Bahner, Jefferson City, Tenn.

No Drawing. Application March 22, 1945,
Serial No. 584,242

9 Claims. (Cl. 260—471)

1

This invention relates to new reaction products of certain ketoesters with nitroolefines, and to a method for preparing them, and more particularly to compounds having the following structural formula:

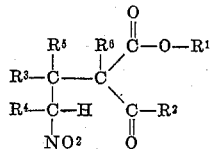

wherein $R^1$ and $R^2$ may be lower alkyl or phenyl, $R^3$ may be hydrogen, lower alkyl, or phenyl, and $R^4$, $R^5$ and $R^6$ may be hydrogen or lower alkyl.

Among the compounds included in the above formula the following may be mentioned by way of illustration: ethyl 2-nitrobutyl(acetyl)acetate; propyl 2-nitrobutyl(acetyl)acetate; butyl 2-nitrobutyl(butyryl)acetate; ethyl nitro-tert-butyl(acetyl)acetate; ethyl 2-nitrobutyl(benzoyl)acetate; ethyl 2-nitrohexyl(acetyl)acetate; ethyl 2-nitro-2-ethylethyl(propyl)(acetyl)acetate; ethyl 2-nitro-1-phenylethyl(acetyl)acetate; phenyl-2-nitrobutyl(acetyl)acetate; ethyl 2-nitro-1-phenylethyl(benzoyl)acetate; and the like.

In practicing my invention, I react the ketoester with a nitroolefine in alkaline solution. I may first convert a part or all of the keto ester to an alkali metal derivative for example by dissolving sodium or potassium metal in the ketoester, or I may use a basic catalyst such as an organic amine to activate the methylene hydrogen of the ketoester. However, I prefer to use alkali metal derivatives of the ketoester, especially in the reactions involving aliphatic nitro-olefines such as 2-nitro-1-butene and 1-nitro-1-pentene since amines tend to encourage side reactions reducing the yields of desired products and since the alkali metal derivatives produce more rapid reaction. The reaction may be carried out by utilizing equivalent proportions of the reactants, or an excess of the ketoester may be used, for example, I may use an excess of the ketoester as a reaction medium. Or, if desired a mutual solvent, inert to the reaction such as dioxane may be used for this purpose. The reactants are preferably mixed portionwise to prevent too violent reaction, and cooling may be employed to maintain the temperature within the desired range, preferably below about 35° C. After the reactants have been mixed the mixture is allowed to stand for a sufficient length of time to insure substantially complete reaction to take place. If the ketoester was used in the form of its sodio

2 derivative, the reaction product will be present at this point in the form of its sodium salt, and may be recovered in this form if desired. Otherwise, the mixture may be acidified at this point, for example, with acetic acid to convert the alkali metal salt to the free product. After removal of the alkali metal by-products the substituted ketoester may be recovered by any desired means such as dissolving in a solvent, by distillation, by converting into other derivatives, or the like.

The ketoesters which I may use in practicing my invention have the following structural formula:

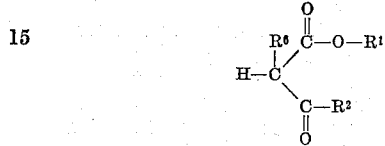

wherein $R^1$ and $R^2$ may be lower alkyl or phenyl radicals, $R^6$ may be hydrogen or lower alkyl. This formula includes such compounds as ethylacetoacetate, ethylbenzoylacetate, ethyl-n-propylacetoacetate, phenylacetoacetate, and the like.

The nitroolefines which are operative in my reaction include nitroethylene and its alkyl and aryl substituted derivatives having the following formula:

wherein $R^3$ may be hydrogen, lower alkyl, or phenyl, and $R^4$ and $R^5$ may be hydrogen or lower alykyl. Among the compounds included by the above formula there may be mentioned nitroethylene; 2-nitropropene; 1-nitropropene; 1-nitro-1-butene; 2-nitro-2-butene; 1-nitro-1-pentene; 3-nitro-3-hexene; 2-nitro-1-butene; 1-nitro-2-methyl-1-propene; ω-nitrostyrene, and the like.

The following specific examples will further illustrate my invention.

Example I

To 6.5 parts of ethylacetoacetate was added 0.23 parts of metallic sodium while cooling to prevent a too violent reaction. To the sodio ethylacetoacetate thus formed was added portionwise 5.05 parts of 2-nitro-1-butene, during which time the temperature of the reaction mixture was maintained at about 15-25° C. by an ice bath. The mixture was allowed to stand for about an hour to insure completion of the reaction whereupon the mixture was acidified with glacial acetic acid to convert the sodio derivative to the free reaction product. Twenty parts of benzene were then added and the mixture was washed with distilled water to remove the sodium salt. The product was distilled whereupon 2.8 parts of ethyl 2-nitrobutyl(acetyl)acetate corresponding to a yield of 25%. The product was analysed for carbon and hydrogen with the following results.

|  | Found | Theory |
|---|---|---|
| Carbon | 51.54 | 51.94 |
| Hydrogen | 7.45 | 7.41 |

*Example II*

A solution of sodium ethyl acetoacetate in excess ethyl acetoacetate was prepared by adding 2 parts of sodium metal to 25 parts of ethyl acetoacetate and heating gently. The solution was then cooled in an ice bath and stirred while adding 4.4 parts of 1-nitro-2-methyl-1-propene dropwise to the solution. Near the end of the addition the ice bath was removed, and stirring continued at room temperature for about ten minutes after all the nitroolefine had been added. Then 6 parts of glacial acetic acid were added to liberate the ethyl nitro-tert-butyl(acetyl)acetate from its sodium salt. The crude product was diluted with benzene and washed with water to remove the sodium salt. The mixture was distilled and the excess ethyl acetoacetate recovered and 5 parts of the product obtained at a temperature of about 119° C. at 1–2 mm. pressure.

A pyrazolone derivative was prepared by refluxing 1 part of the product with a solution prepared by adding 1.5 parts of potassium acetate in 6 parts of hot 95% ethanol to 1 part of semicarbazine hydrochloride in 1 part of hot water. The washed, recrystallized 3-methyl-4-(2-nitro-1,1-dimethylethyl)pyrazolone-5 analysed for carbon and hydrogen with the results given below:

|  | Found | Calculated for $C_8H_{13}N_3O_3$ |
|---|---|---|
| Carbon | 48.56 | 48.24 |
| Hydrogen | 6.70 | 6.53 |

*Example III*

To 8.6 parts of ethyl propylacetoacetate was added 0.23 part of metallic sodium. After all the sodium had reacted, 5.64 parts of 1-nitro-1-butene was added portionwise while maintaining the temperature between about 15 and 35° C. Then 0.95 additional parts of ethyl propyl acetoacetate was added and the mixture was allowed to stand for 36 hours. After standing, the mixture was acidified with glacial acetic acid. The mixture was washed with water to remove the sodium salt. The washed product was dried and distilled resulting in the recovery of 3.9 parts of ethyl 2-nitro-1-ethylethyl(propyl)(acetyl)acetate. The product was analysed and found to have the following constants.

$d_4^{25} = 1.081$; $n_D^{25} = 1.461$. Molecular refraction calculated for $C_{13}H_{23}O_5N = 69.4$ Found for product 69.5.

|  | Found | Calculated |
|---|---|---|
| Carbon | 57.38 | 57.08 |
| Hydrogen | 8.48 | 8.68 |

*Example IV*

At about 30° C., 15 parts of ω-nitrostyrene was dissolved in 13 parts of ethyl acetoacetate. To this solution was added .35 parts of triethylamine and the temperature prevented from rising appreciably above 30° C. by the use of a water bath. The mixture was allowed to stand for two days whereupon the mixture had set to a solid. The solid was then dissolved in 60 parts of ethanol, the solution cooled to 0° C. and filtered. White needle-shaped crystals of ethyl 2-nitro-1-phenylethyl(acetyl)acetate were obtained which upon recrystallization from benzene and ethanol had a melting point of 74° C. and the following analysis.

|  | Found | Calculated for $C_{14}H_{17}NO_5$ |
|---|---|---|
| Carbon | 60.12 | 60.20 |
| Hydrogen | 5.98 | 6.14 |

*Example V*

In 9.61 parts of ethyl benzoylacetate were dissolved 7.46 parts of ω-nitrostyrene and 0.1 part of triethylamine were added to the solution. The mixture was allowed to stand for about a week. After a few hours standing the mass had become gelatinous, and after a week the material had changed to a mass of crystals. The crystals were dissolved in 200 parts of absolute ethyl alcohol and filtered while hot. Upon cooling crystals of ethyl 2-nitro-1-phenylethyl(benzoyl)acetate were obtained which on recrystallization had a melting point of 97° C. and analyzed as follows:

|  | Found | Calculated for $C_{19}H_{19}NO_5$ |
|---|---|---|
| Carbon | 66.24 | 66.85 |
| Hydrogen | 5.60 | 5.61 |

While the above describes the preferred embodiments of my invention it will be understood that departures may be made therefrom within the scope of the specification and claims.

What is claimed is:

1. As new compositions of matter the substituted ketoesters having the following structural formula:

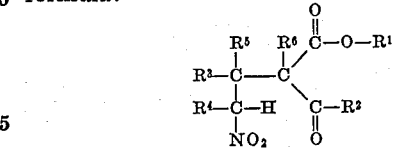

wherein $R^1$ and $R^2$ are members selected from the group consisting of lower alkyl and phenyl radicals, $R^3$ is a member selected from the group consisting of hydrogen, lower alkyl, and phenyl, and $R^4$, $R^5$ and $R^6$ are selected from the group consisting of hydrogen and lower alkyl.

2. Ethyl 2-nitrobutyl(acetyl)acetate.
3. Ethyl-2-nitro-1-phenylethyl(acetyl)acetate.
4. Ethyl 2-nitro-1-phenylethyl(benzoyl)acetate.
5. In a process for preparing substituted ketoesters having the following structural formula:

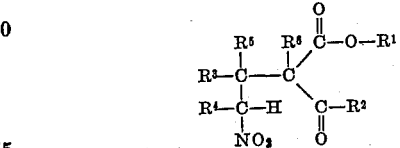

wherein $R^1$ and $R^2$ are members selected from the group consisting of lower alkyl and phenyl radicals, $R^3$ is a member selected from the group consisting of hydrogen, lower alkyl, and phenyl, and $R^4$, $R^5$ and $R^6$ are selected from the group consisting of hydrogen and lower alkyl the steps which comprise reacting in the presence of an alkaline catalyst a ketoester having the following formula:

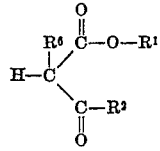

wherein $R^1$ and $R^2$ are selected from the group consisting of lower alkyl and phenyl radicals and $R^6$ is selected from the group consisting of hydrogen and lower alkyl radicals; with a nitroolefine having the following formula:

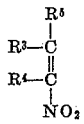

wherein $R^3$ is a member selected from the group consisting of hydrogen, lower alkyl, and phenyl radicals, and $R^4$ and $R^5$ are members selected from the group consisting of hydrogen and lower alkyl.

6. In a process for preparing substituted ketoesters having the following structural formula:

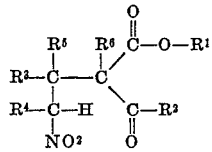

wherein $R^1$ and $R^2$ are members selected from the group consisting of lower alkyl and phenyl radicals, $R^3$ is a member selected from the group consisting of hydrogen, lower alkyl, and phenyl, and $R^4$, $R^5$ and $R^6$ are selected from the group consisting of hydrogen and lower alkyl the steps which comprise reacting an alkali metal salt of a ketoester having the following formula:

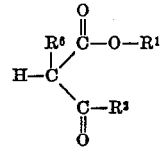

wherein $R^1$ and $R^2$ are selected from the group consisting of lower alkyl and phenyl radicals and $R^6$ is selected from the group consisting of hydrogen and lower alkyl radicals; with a nitroolefine having the following formula:

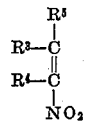

wherein $R^3$ is a member selected from the group consisting of hydrogen, lower alkyl, and phenyl radicals, and $R^4$ and $R^5$ are members selected from the group consisting of hydrogen and lower alkyl.

7. In a process for preparing ethyl 2-nitrobutyl-(acetyl)acetate, the steps which comprise reacting an alkali metal salt of ethylacetoacetate with 2-nitro-1-butene in the liquid phase.

8. In a process for preparing ethyl 2-nitro-1-phenylethyl(benzoyl)acetate, the step which comprises reacting ethyl(benzoyl)acetate with ω-nitrostyrene in the liquid phase in the presence of a basic catalyst.

9. In a process for preparing ethyl 2-nitro-1-phenylethyl(acetyl)acetate, the step which comprises reacting ethylacetoacetate with omega-nitrostyrene in the liquid phase in the presence of an alkaline catalyst.

CARL T. BAHNER.

REFERENCES CITED

The following references are of record in the file of this patent:

UNITED STATES PATENTS

| Number | Name | Date |
|---|---|---|
| 2,343,256 | Hass et al. | Mar. 7, 1944 |
| 2,348,159 | Staudinger | May 2, 1944 |
| 2,287,510 | Bruson I | June 23, 1942 |
| 2,328,370 | Wiest | Aug. 31, 1943 |
| 2,383,444 | Bruson II | Aug. 28, 1945 |
| 2,386,736 | Bruson III | Oct. 9, 1945 |